April 17, 1962   A. E. HOYLER   3,029,460
WINDSHIELD WIPER BLADE
Filed Nov. 20, 1957

Patented Apr. 17, 1962

3,029,460
WINDSHIELD WIPER BLADE
Alfred Ernst Hoyler, Buhlertal, Baden, Germany, assignor, by mesne assignments, to Robert Bosch, G.m.b.H., Stuttgart, Germany, a German corporation
Filed Nov. 20, 1957, Ser. No. 697,646
Claims priority, application Germany Nov. 24, 1956
4 Claims. (Cl. 15—250.42)

My invention relates to a windshield wiper blade for automotive vehicles, and more particularly to a blade assembly in which the squeegee member of rubber or the like material is backed by a leaf spring which in turn is secured to a holder structure to be mounted on the reciprocating wiper arm of the vehicle.

During operation of such windshield wipers, the squeegee member moves back and forth along the windshield and, due to friction at the windshield, yields laterally toward its trailing side. It may then happen that parts of the holder assembly, particularly the claw members used for fastening the backing leaf spring to the holder, may touch the windshield, thus scratching the windshield pane and producing noise.

In a known windshield wiper of the above-mentioned type, an attempt is made to avoid such disadvantage by providing the leaf spring along the back of the squeegee member with rubber sleeves, which are seated upon the leaf spring and protrude laterally therefrom a larger distance than the claws fastening the leaf spring to the holder, so that the lateral ends of the rubber members may engage the winshield to keep the claws away therefrom.

It is an object of my invention to eliminate the above-mentioned shortcomings in a simpler manner and without necessity of providing additional components for the protection of the windshield.

To this end, and in accordance with a feature of my invention, the holder claws or those claw parts that protrude laterally over the edges of the backing spring are formed of soft elastic material such as synthetic elastomers, for example, those available in the trade under the trade name nylon. According to another feature, the holder bars on which the claws are mounted are likewise made of such a soft-elastic material. By virtue of such material, any contact of the claws or holder parts with the windshield is no longer detrimental to the windshield surface and does not cause disagreeable noise. There is likewise no danger that, during tipping movement of the blade, any disturbing noise may occur at the locations where the leaf spring is fastened to the holder structure of the windshield wiper, because the elastic-material claws, laterally protuding over the holder bars, also prevent the respective metal parts of the assembly from touching each other.

According to one of the more specific features of the invention, the above-mentioned holder bars which carry the claws are made of metal, and only the claws are made of soft elastic material and are mounted and locked on the holder bars by forcing the claws onto the holder ends and in respective constricted portions of these ends, as will be more fully set forth in the following.

The above-mentioned features and advantages of the invention will be apparent from the embodiment of a windshield wiper according to the invention shown, by way of example on the accompanying drawing in which.

Figure 1:
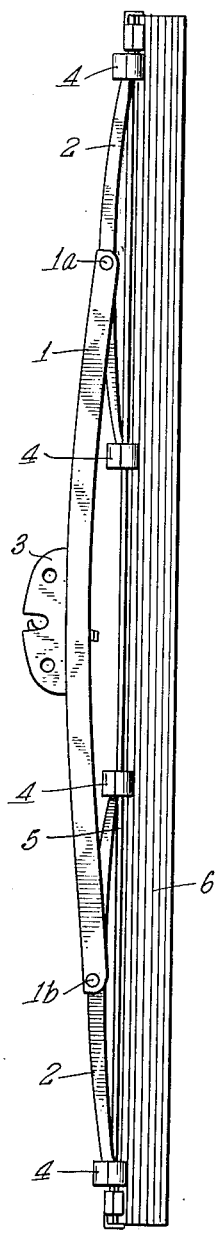
FIG. 1 is a side view of the complete windshield-wiper assembly.

The illustrated windshield wiper comprises a main holder bar 1 of arcuate shape to which two lateral holder bars 2, likewise of arcuate shape, are pivotally linked at 1a and 1b. The main holder bar 1 carries in its middle an attachment 3 for fastening the wiper to the oscillating wiper arm (not shown) of the vehicle. Mounted on both ends of each lateral holder bar 2 is a holder claw 4 which consists of a soft elastic material, preferably of nylon or another synthetic elastomer. Each of the claws 4 has a main portion seated on the holder bar 2 and has two lateral claw portions 13 and 14 which jointly straddle a leaf spring 5 of metal which extends along the back of a squeegee member 6 firmly joined with the leaf spring 5 along the entire length of the assembly.

Figure 2:
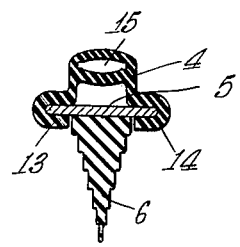
FIG. 2 is a front sectional view of one of the holder claws.
Figure 3:
FIG. 3 is an enlarged bottom view onto one of the holder bars of the same wiper assembly.

As shown in FIG. 2, each elastic-material claw member 4 has a body portion provided with an oval opening 15 extending in the longitudinal direction of the holder bar 2. When the claw body is compressed in the direction of the small diameter of the oval shape, the opening widens in the direction of its large diameter and in this condition permits pushing the claw over the end of the holder member 2 on which the claw is to be seated and locked in position. The individual holder member 2 is channel-shaped, the channel being open toward the left of the assembly as shown in FIG. 1. As is apparent from the bottom view of holder 2 shown in FIG. 3, the holder bar has two ends of flat cross section. Each end 10 is constricted by two recesses 11 so as to form a shoulder portion. The width of the constricted portion corresponds to that of the oval opening 15 in claw 4 when the claw is in relaxed condition as shown in FIG. 2. When the claw body is kept compressed and pushed over the end 10 of holder bar 2, the oval opening 15 becomes seated in the constricted portion 11, and, when the claw body is released, the elasticity of its soft material causes the claw to become firmly seated and locked in the constriction so that the claw cannot inadvertently slide off. The U-shaped portions 13 and 14 jointly straddle the longitudinal edges of the backing leaf spring 5 so that they jointly clamp the backing spring together with the holder 2.

It will be recognized that when, during wiping operation, the squeegee blade 6 tilts laterally toward or away from the viewer of the drawing, the projecting portions 13 and 14 may touch the windshield in the event of excessive deflection. However, since these projections are of soft elastic material, any scratching of the windshield and the attendant noise are prevented. The elastic claws also prevent the metal spring 5 from touching any of the other metal parts 1 and 2 of the wiper assembly, thus contributing to noise prevention.

I claim:

1. A wiper blade for windshield wipers, comprising an elongated squeegee member having a wiper portion and a head portion, a leaf spring attached to the head portion of said squeegee member, an elongated holder bar extending along said leaf spring on the side remote from said squeegee member, said holder bar having end portions of flat cross section, each end portion defining a constricted portion of predetermined width with a shoulder at each end of each constricted portion, a claw member of soft elastic material mounted on said holder bar at each of said end portions, each of said claw members having two claw portions surrounding the respective lateral edges of said leaf spring to jointly straddle and clamp said spring to said holder bar, said claw portions each protruding beyond said edges, said claw members each having an intermediate portion connecting said claw portions, said intermediate portion defining within its cross section an oval-shaped opening of variable width and length, said length of said oval-shaped opening in the assembled condition of said claw member with said holder bar corresponding to the width of the constricted portion of said bar.

2. A wiper blade for windshield wipers, comprising an elongated squeegee member having a wiper portion and a head portion, a leaf spring attached to the head portion of said squeegee member, an elongated holder bar extending along said leaf spring on the side remote from said squeegee member, said holder bar having end portions of flat cross section, each end portion defining a constricted portion of predetermined width with a shoulder at each end of each constricted portion, a claw member of soft elastic material mounted on said holder bar at each of said end portions, each of said claw members having two claw portions slrrounding the respective lateral edges of said leaf spring to jointly straddle and clamp said spring to said holder bar, said claw portions each protruding beyond said edges, said claw members each having an intermediate portion connecting said claw portions, said intermediate portion defining within its cross section an oval-shaped opening of variable width and length, said length of said oval-shaped opening in the assembled condition of said claw member with said holder bar corresponding to the width of the constricted portion of said bar, the length of said constricted portion between its shoulders being coextensive with the length of a respective claw member for longitudinally retaining same in position.

3. A wiper blade for windshield wipers, comprising an elongated squeegee member having a wiper portion and a head portion, a leaf spring attached to the head portion of said squeegee member, an elongated holder bar extending along said leaf spring on the side remote from said squeegee member, said holder bar being of metallic material and having a channel shaped cross-section open toward the side away from said squeegee member, said holder bar having end portions of flat cross section, each end portion defining a constricted portion of predetermined width with a shoulder at each end of each constricted portion, a claw member of soft elastic material mounted on said holder bar at each of said end portions, each of said claw members having two claw portions surrounding the respective lateral edges of said leaf spring to jointly straddle and clamp said spring to said holder bar, said claw portions each protruding beyond said edges, said claw members each having an intermediate portion connecting said claw portions, said intermediate portion defining within its cross section an oval-shaped opening of variable width and length, said length of said oval-shaped opening in the assembled condition of said claw member with said holder bar corresponding to the width of the constricted portion of said bar, whereby during assembly said claw members can be laterally compressed and shoved onto said flat portions of said holder bar to be locked within the shoulders of respective constricted portions, and whereby noise during flexing and operation of said wiper blade, claw member and holder bar by metal to metal contact and metal to windshield contact is prevented.

4. A wiper blade for windshield wipers, comprising an elongated squeegee member having a wiper portion and a head portion, a leaf spring attached to the head portion of said squeegee member, an elongated holder bar extending along said leaf spring on the side remote from said squeegee member, said holder bar being of metallic material and having end portions of flat cross section, each end portion defining a constricted portion of predetermined width with a shoulder at each end of each constricted portion, a claw member of soft elastic material having an oval-shaped opening slidable onto each of said end portions of said holder bar for restraining engagement of said claw member with said constricted portion and said shoulders to retain said claw member in position on said holder bar, each of said claw members having two claw portions slidable onto the respective lateral edges of said leaf spring to jointly straddle and clamp said spring to said holder bar.

References Cited in the file of this patent

UNITED STATES PATENTS

| | | |
|---|---|---|
| 2,700,785 | Oishei | Feb. 1, 1955 |
| 2,750,617 | Oishei | June 19, 1956 |
| 2,782,448 | Anderson | Feb. 26, 1957 |
| 2,825,952 | Van Driel | Mar. 11, 1958 |

FOREIGN PATENTS

| | | |
|---|---|---|
| 639,708 | Great Britain | July 5, 1950 |